United States Patent [19]

Heartz

[11] Patent Number: 4,821,212

[45] Date of Patent: Apr. 11, 1989

[54] THREE DIMENSIONAL TEXTURE GENERATOR FOR COMPUTED TERRAIN IMAGES

[75] Inventor: Robert A. Heartz, DeLand, Fla.

[73] Assignee: General Electric Company, Syracuse, N.Y.

[21] Appl. No.: 638,707

[22] Filed: Aug. 8, 1984

[51] Int. Cl.[4] ................................................. G09B 9/08
[52] U.S. Cl. .................................. 364/521; 358/104; 364/522; 434/43
[58] Field of Search ............... 364/520, 521, 522, 516; 358/104; 434/2, 43

[56] References Cited

U.S. PATENT DOCUMENTS

| | | | |
|---|---|---|---|
| 3,621,214 | 10/1971 | Romney et al. | 364/521 |
| 3,671,729 | 6/1972 | Lux | 364/520 |
| 3,769,442 | 10/1973 | Heartz et al. | 364/516 |
| 4,017,985 | 4/1977 | Heartz | 434/2 |
| 4,179,824 | 12/1979 | Marsh | 364/521 |
| 4,343,037 | 8/1982 | Bolton | 358/104 |
| 4,475,104 | 10/1984 | Shen | 364/521 |

FOREIGN PATENT DOCUMENTS 0144924  6/1985  European Pat. Off. ............ 364/522

Primary Examiner—Salvatore Cangialosi
Attorney, Agent, or Firm—Stephen A. Young; Carl W. Baker

[57] ABSTRACT

An improvement for the real-time computer generation of visual scenes based on an algorithm that reduces the processing of elevation data to simple repetitive accumulations and a compare operation to generate occult data using grid elevation data bases is disclosed. The improvement adds three dimensional texture to close approach scenes to provide visual cues to the observer. The texture data is derived from the grid elevation data base itself and includes delta elevation and delta color values. The delta elevation values are added to the interpolated elevations computed by the image generator and the delta color values modulate the interpolated colors computed by the image generator. Since the texture data base is derived from the grid data base itself, the texture data base is already on-line thereby simplifying the memory and computational requirements of the computer image generator. This approach results in the generation of very realistic terrain images in which the texture correlates with the actual terrain and the texture is already properly sun shaded.

8 Claims, 6 Drawing Sheets

FIG. 6

| STEP SIZE | FRAME | | | | | | | | | |
|---|---|---|---|---|---|---|---|---|---|---|
| | #1 | #2 | #3 | #4 | #5 | #6 | #7 | #8 | #9 | #10 |
| $\frac{\Delta R}{16}$ | 1 | | | | | | | | | |
| | 1 | 2 | | | | | | | | |
| | 3 | 3 | 3 | | | | | | | |
| | 4 | 4 | 4 | 4 | | | | | | |
| $\frac{\Delta R}{8}$ | | 5 | 5 | 5 | 5 | | | | | |
| | 6 | ⑥ | 6 | 6 | 6 | 6 | | | | |
| | | X7 | | 7 | 7 | 7 | 7 | | | |
| | 8 | 8 | 8 | ⑧ | 8 | 8 | 8 | 8 | | |
| | | X9 | | | 9 | 9 | 9 | 9 | | |
| | 10 | 10 | 10 | 10 | 10 | ⑩ | 10 | 10 | 10 | 10 |
| | | X11 | | | | | | 11 | 11 | 11 |
| | 12 | 12 | 12 | 12 | 12 | 12 | 12 | ⑫ | 12 | 12 |
| $\frac{\Delta R}{4}$ | | X13 | | | | | | | | 13 |
| | | 14 | 14 | 14 | 14 | 14 | 14 | 14 | 14 | ⑭ |
| | | | | | | | | | | |
| | 16 | ⑯ | ⑯ | 16 | 16 | 16 | 16 | 16 | 16 | 16 |
| | | X17 | | | | | | | | |
| | | | | | 18 | 18 | 18 | 18 | 18 | |
| | | | | | | | | | | |
| | 20 | 20 | 20 | 20 | 20 | ⑳ | ⑳ | 20 | 20 | 20 |
| | | X21 | | | | | | | | |
| | | | | | | | | | | 22 |
| | | | | | | | | | | |
| | 24 | 24 | 24 | 24 | 24 | 24 | 24 | 24 | 24 | ㉔ |
| | | X25 | | | | | | | | |
| | | | | | | | | | | |
| | | | | | | | | | | |
| | 28 | 28 | 28 | 28 | 28 | 28 | 28 | 28 | 28 | 28 |

THREE DIMENSIONAL TEXTURE GENERATOR FOR COMPUTED TERRAIN IMAGES

CROSS-REFERENCE TO RELATED APPLICATION

The present invention is an improvement to my invention described in U.S. Pat. No. 4,583,185, entitled "Incremental Terrain Image Generator", and assigned to the assignee of this application. The subject matter of my earlier filed patent is incorporated herein by reference.

FIELD OF THE INVENTION

This invention generally relates to a system and technique for the generation of images on a display device which simulate infrared or radar images and, more particularly, to real-time computer simulation of visual images of perspective scenes such as landscapes and seascapes.

BACKGROUND OF THE INVENTION

The principal application area for computer image generation (CIG) has been that of visual training simulators which present scenes to an observer or trainee to allow the observer to practice some task, such as flying an airplane. In a flight simulator, a three-dimensional model of the desired "gaming area" is prepared and stored on magnetic disk or similar bulk storage media. This model is called the visual data base. The visual simulator combines an image generator with an electro-optical display system such as a cathode ray tube (CRT) or similar display. The image generator reads in blocks of three-dimensional data from the disk and transforms this data into two-dimensional scene descriptions. The two-dimensional data are converted to analog video that is presented to the operator or trainee via the display. The generated imagery is meant to be representative of the true scenes that the operator would see if the operator were actually performing the task being simulated. The generation of the display images is said to be in "real time" which is normally taken to mean 30 frames per second, as in the U.S. television standard. CIG systems are described in detail in the book entitled *Computer Image Generation* edited by Bruce J. Schacter and published by Wiley-Interscience (1983).

Computer generation of visual representations of objects whose various vertices, edges and planes are defined by data bases referenced to a system of axes is described in U.S. Pat. Nos. 3,603,703 to Warnock, 3,621,214 to Romney et al, and 3,665,408 to Erdahl et al. These teach general means for converting such data into a two-dimensional perspective view, with tests for determining which of several overlapping objects will be visible and conceal the others. The scan employed for presentation of the visual image on a cathode-ray tube (CRT) is a conventional horizontally scanned raster. U.S. Pat. No. 3,671,729 to Lux teaches means to cause a mechanical plotter to draw curves or profiles (provided as electrical input signals giving elevation and range for successive radial scans) in which the profile parts which would be out of the field of view of an elevated observer are omitted. The device is not indicated as having any application to electronic image generation, nor does it appear that it could be so applied. U.S. Pat. No. 3,736,564 to Watkins teaches the conversion of electrical signals defining surfaces of a three-dimensional object onto a device such as a CRT. The converted signals defining the relative depths of segments of the surfaces along each scan line of the dispaly and selectively subdividing the scan lines according to the visual characteristics of the segments when necessary. Signals defining the visible segments are then utilized to control the intensity of the display.

The real-time computer generation of visual images of landscapes and seascapes find particular use in aircraft or ship simulators. U.S. Pat. No. 3,769,442 to Heartz et al describes a process for producing a compressed data base for a radar land mass simulator. U.S. Pat. No. 4,017,985 to Heartz describes a process for the generation of a radar and a perspective scene in which teh tangent of fthe view angle is computed for each range element along a sweep. This process requires a high speed multiply and divide to compute the tangent which is then compared to a stored maximum to determine if the element is seen. If it is seen, it is compared to the last value to fill in skipped pixels. U.S. Pat. No. 4,343,037 to Bolton describes a visual display system in which a pipeline processor is used to compute in real-time the perspective transformation from the textured ground surface plane to the display plane. Application Ser. No. 527,809 filed Aug. 30, 1983, by M. Bunker and assigned to the assignee of this application discloses techniques to reduce dynamic aliasing problems in real time images generated from a textured grid data base.

Real-time generation of visual scenes is at best a difficult computational problem. The more realistic the scene, the more complex the computational problem seems to become. This in turn imposes a severe requirement on the hardware design. In my prior U.S. Pat. No. 4,583,185, I describe an algorithm for the real-time computer generation of visual scenes that uses a few simple mathematical functions resulting in a significant speed-up of scene generation time and a corresponding simplification of the hardware requirements. I accomplished this by replacing the multiply and divide operations normally performed with simple, repetitive accumulate operations. Seen elements and pixel fill-in are implemented by a single compare. The range elements of the sweep are scanned by progressively incrementing a delta view angle tangent. Occulting is determined by comparing the projection on the Z axis of delta view angle tangent at the element range to the altitude minus element elevation. If the projection is greater than altitude minus element elevation, the point is seen and the delta tangent view angle is incremented. Otherwise, the point is hidden and the range is incremented. The invention described in my prior U.S. Pat. No. 4,583,185 uses an X-Y grid data base of the type produced by the Defense Mapping Agency (DMA) in contrast to the vector schemes that were typically used in the prior art. Since only simple addition operations performed with an accumulator and a compare operation are used, the mathematical processing is greatly simplified when compared with the multiplication and division operations resorted to by the prior art.

The view ray image processor according to my earlier filed U.S. Pat. No. 4,583,185 produces very realistic terrain scenes from DMA data bases. However, due to the sparse grid spacing, detail in the foreground is inadequate to provide depth and motion cues for low level flight simulation. Textured surfaces are implemented in CIG systems to provide visual motion cues and to enhance image realism. U.S. Pat. No. 4,586,038 to Sims teaches generating a geometric pattern on a plane surface. The aforementioned Bunker application Ser. No. 527,809 applies a cell map, which can be a digitized photograph or a pseudo random spatial noise pattern, to texture a surface. The Bolton U.S. Pat. No. 4,343,047, discloses a system which incorporates a limited implementation of the cell map approach. All of these approaches superimpose a two dimensional texture pattern on a plane surface.

The DMA elevation and planimetric data bases with a grid spacing of 300 feet are much too coarse for close approach terrain scenes. For stable dynamic scenes, the grid spacing should approximately equal the image pixel size. In a test simulation, a 512×512 DMA grid was converted to a 512×512 pixel image. If the range increment equals the grid size, the stable image range occurs approximately 13×6 miles from the view point. At ranges of less than 6 miles, the grid cell covers several pixels. This results in a venetian blind effect. The grid posts appear as separated two dimensional slats which are unstable with view point movement. The venetian blind effect can be removed by decreasing the range step size. The elevation posts now appear as solid blocks and they are stable with view point movement. The block effect can be removed by bilinear interpolation between grid points. Unfortunately, this results in very smooth foreground image which provides poor visual cues. A three dimensional texture pattern is required to add to the interpolated elevation values and to modulate the interpolated color values.

Another application for this invention is the simulation of sensor images for mission training simulators. Both synthetic aperture radar (SAR) and forward looking infrared (FLIR) can spotlight, or zoom, to provide high resolution (better than ten feet) images of terrain at long ranges from the aircraft. A mission training exercise can range over thousands of miles. It is not practical to provide a high resolution data base over this large gaming area. Typically, high resolution data bases are developed only for the target area and navigation checkpoints. For valid training, these high resolution spots must be merged with synthetically generated terrain. This invention accomplishes this by folding the coarse data base into the high resolution sensor field of view.

SUMMARY OF THE INVENTION

It is therefore an object of the present invention to provide a three dimensional texture generator for computed terrain images.

It is another object of the invention to enhance terrain image realism and to provide visual cues in the foreground of computer images generated from sparse elevation and planimetric grid data bases.

It is a further and more specific object of the invention to provide a technique for achieving a texture map in a very simple and cost effective way for the view ray image processing technique of generating computer images.

According to the invention, the foregoing objects are achieved by using the DMA data base itself for the three dimensional texture pattern. Inattempting to solve the problem of providing a three dimensional texture pattern for a computed terrain image, fractal interpolation was first explored as a method for foreground break-up of close approach images. Fractal interpolation adds to each interpolated sum a pseudo random value derived from the local grid parameters. While this approach showed promise, it required complex calculations to derive shading and was very sensitive to terrain characteristics. More stable results were achieved by using a three dimensional random texture map. This provided visual cues but lacked in scene realism. The best results were achieved by using the DMA data base itself as a texture map and folding this map into the foreground. To provide the foreground visual cues, there is added a delta elevation to each interpolated elevation and a delta color modules the interpolated color or shade. The delta values are derived from a cell map. The cell maps are the elevation and grey shaded planimetric data bases. For each interpolated point, an uninterpolated value is read from the data base and applied as the delta value, thereby folding the large data base into the foreground. The advantages of this approach are as follows: (1) the texture map is properly shaded and is readily available, (2) the texture characteristics reflect the local terrain, (3) texture cell size matches, within one quantization area, the pixel size so that there is no aliasing at the horizon, and (4) it is easy to implement in hardware. The disadvantages are that (1) the texture map to the horizon is not desired and (2) prominent data base features may have evident repetition. The first disadvantage is overcome by simply fading the texture map out as a function of range. As the main purpose of texture is to provide visual cues in the foreground, the fading of texture is the background presents no problems. The natural density of the DMA data provides long range visual cues. The second disadvantage requires such features as a snow capped peak, for example, to be removed from the texture data base. This is simply done by inhibiting colors. A further very critical requirement addressed by the invention is that, when the viewpoint moves, the texture stays stationary relative to terrain and that pixels do not blink on and off. This is accomplished by controlling the quantization between levels of interpolation so that the addressed cells remain the same. One texture map is used for all levels of detail.

BRIEF DESCRIPTION OF THE DRAWINGS

The foregoing and other objects, aspects and advantages of the invention will be better understood from the following detailed description with reference to the drawings, in which:

FIG. 6 is a table showing the required quantization;

DETAILED DESCRIPTION OF THE INVENTION

Figure 1:
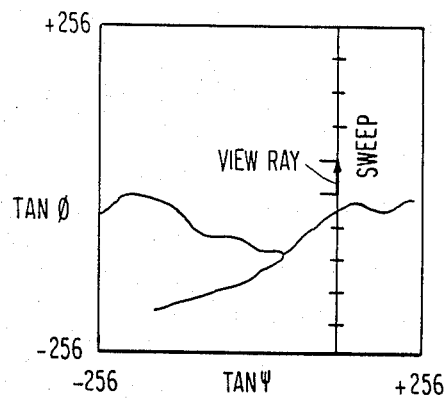
FIG. 1 is a diagramatic illustration of a 512×512 element CRT display wherein the number of elements corresponds to a grid data base.
Figure 2:
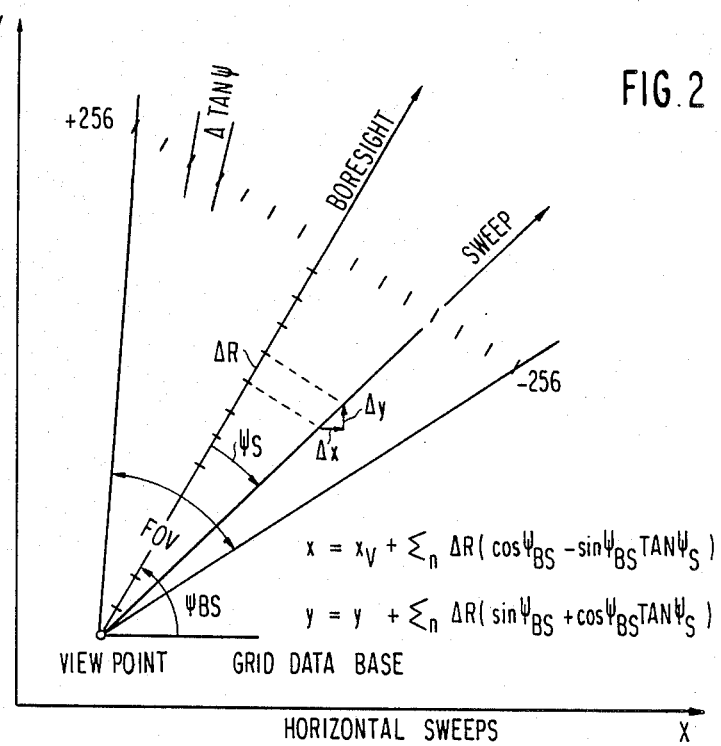
FIG. 2 is a graphical representation of the horizontal sweeps from the view point.

A description of the three dimensional texture generator according to the present invention must be preceded with an understanding of the view ray approach which will be described with reference to FIGS. 1 to 4 of the drawings. Terrain occulting, that is what is hidden from a specific viewpoint, is a key calculation to all image generators. My earlier invention described in U.S. Pat. No. 4,583,185 provided a fast summation algorithm for generating occult data or perspective scenes using grid elevation data bases. Such grid data bases are produced, for example, by the Defense Mapping Agency (DMA). A DMA terrain elevation data base is typically a 512×512 array of elevation posts that are 300 feet apart. A corresponding planimetric grid data base defines features colors such as for lakes, forests, snow caps, fields and so forth. According to the view ray processing technique, a vertical column of the output image, i.e. a vertical raster, is first defined as a sweep which is composed of 512 view ray elements, as shown in FIG. 1. The horizontal field of view (FOV) is defined as plus and minus 256 sweeps which are defined by equal increments perpendicular to the boresight. Any sweep is transformed to the grid data base as shown in FIG. 2. The processing starts incrementing $\Delta R$ from the view point. $\Delta R$ is shown as equal steps, but in practice, the R steps are expanded as they move away from the view point. For any sweep, a $\Delta X$ and $\Delta Y$ can be defined. The accumulation of $\Delta X$ and $\Delta Y$ is the X,Y data base address which is used to extract the elevation and color for that sweep element.

Figure 3:
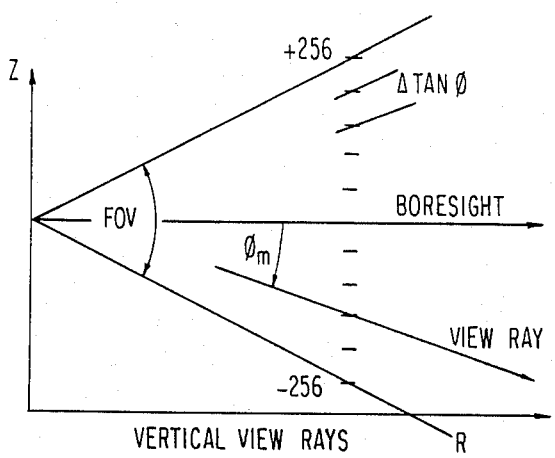
FIG. 3 is a graphical representation of the vertical sweeps from the view point.
Figure 4:
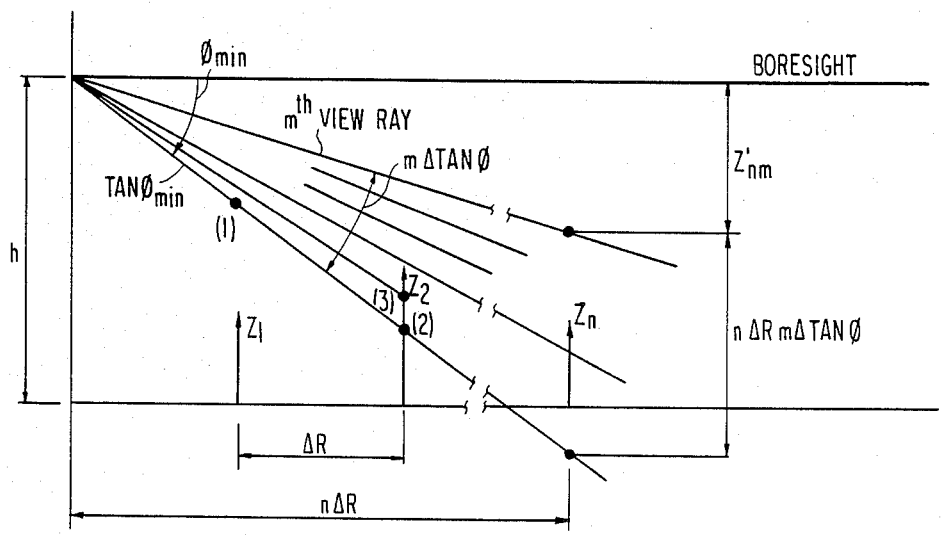
FIG. 4 is a graphical illustration of the view ray processing according to my prior invention.

For a given sweep, the vertical view rays are shown in FIG. 3. Again, the field of view is defined as plus or minus 256 equal steps normal to the view ray. The view ray processing is illustrated in FIG. 4. For each range increment, the view ray steps down by an increment of $\Delta R \mathrm{Tan} \phi_{min}$. A simple compare at each range increment determines if the view ray strikes an elevation post. If the view ray is above the elevation post, the next elevation post a color is read from the data base. If the view ray strikes the post, the color for that post is read to the CRT display via a refresh memory.

Considering FIG. 4 in more detail, the edge of the vertical field of view is $\phi_{min}$. The first view ray projection (point 1) on the Z axis is $\Delta R \mathrm{Tan} \phi_{min}$. Since $\Delta R \mathrm{Tan} \phi_{min}$ is less than $(h-Z_1)$, $Z_1$ does not intersect the field of view, and therefore we increment to the next elevation, $Z_2$. The projection of the view ray at $Z_2$ is $2\Delta R \mathrm{Tan} \phi_{min}$. This is greater than $(h-Z_2)$ which means that $Z_2$ is seen. The tangent of the view angle is incremented to point 3 and, again, $Z_2$ is seen. The tangent of the view angle is incremented until its projection on the Z axis is greater than $(h-Z_2)$, then we increment to the next elevation point and so forth. It is therefore evident that if a view ray strikes an elevation post, that point is seen and remains seen until the view ray is incremented to a point above the elevation post. If a view ray is above an elevation post, then the point is occulted.

Summarizing, for each range increment, the view ray steps down by an increment of $\Delta R \mathrm{Tan} \phi_m$, where the subscript "m" refers to the $m^{th}$ view ray. For each range increment, the distance between sweeps increases by the increment $\Delta R \Delta \mathrm{Tan} \phi$. A simple compare at each range increment determines if the view ray strikes an elevation post. If the view ray is above the elevation post, the next elevation post and color is read from the data base. If the view ray strikes the post, the color for that post is read to the display via the refresh memories. Thus, view ray processing is implemented by repetitive counters, accumulators and comparators. Priority is automatically handled by incrementing range and the view rays from minimum to maximum.

Digital data bases defining terrain and other features have been prepared for most of the United States and many parts of the world by the Defense Mapping Agency (DMA). The DMA elevation data base (Level I) is a three arc second grid of elevation posts. The DMA planimetric data base is in a vector format where vectors bound a feature, i.e. lakes, forest, desert, cities, and so forth. The feature code can be interpreted as a color (visual), an emissivity (FLIR) or a reflectivity (radar).

The data base used in this invention was derived from DMA data bases. The elevation data base was converted to a 300 foot x,y grid of eight-bit elevation posts. The corresponding DMA planimetric data base was converted to an equivalent grid providing an eight-bit color code for each elevation post. The color code was modulated by a sun shade factor that was derived from the elevation data base. Color was encoded as the three most significant bits defining a color and the five least significant bits defining a grey scale.

Figure 5A:
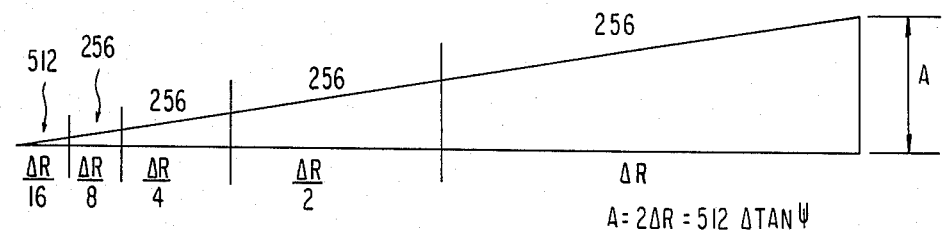
FIGS. 5A and 5B are graphical representations of the three dimensional texture geometry.
Figure 5B:
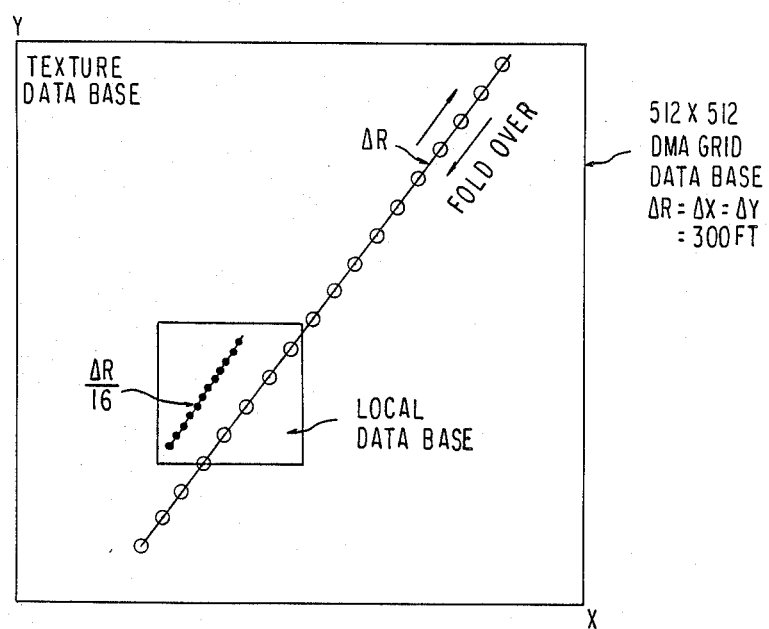

FIGS. 5A and 5B illustrate the approach where the DMA data base is used as the texture map. FIG. 5A defines the interpolation ranges. In the foreground, for the first 512 samples, the data base grid is interpolated by a factor of 16. The next 256 samples are interpolated by a factor of eight, and so forth. The local area data base, FIG. 5B, is a small area in the foreground that is interpolated by a factor of 16. This is an array of 32×32 grid cells and in a close approach scene defines roughly one half the perspective image. Each interpolated cell is merged with a cell from the texture data base which is the whole DMA data base sampled at full $\Delta R$ intervals when interpolation is 16, $2\Delta R$ when interpolation is 8, etc. This folds the DMA data base into the scene foreground as a texture map.

A very critical requirement is that, when the viewpoint moves, the texture stays stationary relative to terrain and that pixels do not blink on and off. The solution adopted in a preferred embodiment of the invention is to control the quantization between levels of interpolation so that the addressed cells remain the same. One texture map is used for all levels of detail. The problem and soluton are illustrated by FIG. 6. The numbers in the column refer to cells. The view point is advanced one cell per frame, e.g. the frame=2 column is one cell advancement in the view point. There are four steps between quantization levels. In frame=2, if we take four steps and change quantization level, cells 7, 9, 11 and 13 will be addressed. In frame=3, we move back to the 8, 10, 12 and 14 cells. This goes throughout the sweep and will create a gross dynamic scintillation between frames that is beyond correction by subpixel smoothing. The required correction is indicated by the circled numbers. In frame=2, if we take five steps and then change quantization levels, the generated addresses match the frame=1 addresses. By taking an added step, as indicated by the circled numbers, the cells match up. The same result can be achieved by stepping back one cell at each of the circled numbers.

The correction can be implemented by simple modular counters in both the X and Y address generators. A further constraint is that ythe input motion should always be a quantum step, i.e. one cell or one fourth of a cell when subpixel smoothing is implemented. This is particularly critical in a software simulation where floating point calculations are used and then truncated at the output. A non-quantum input will accumulate and generate a wrong address. Strict quantization control can replace blended level of detail maps. It could also be applied to cell textured models, but there would be image degradation. Degradation of a pseudo random texture map is no problem.

Using the invention, excellent close approach textured images have been developed using a 256×256 area of the DMA data. The texture shade was the five bit grey scale of the data base. This avoided having very evident features, such as snow capped peaks, repeating in the pattern. The texture elevation was the elevation data base shifted by five bits (divided by 32). When the texture sweep address exceeded the map, the address was folded over to retrace the sweep.

Figure 7:
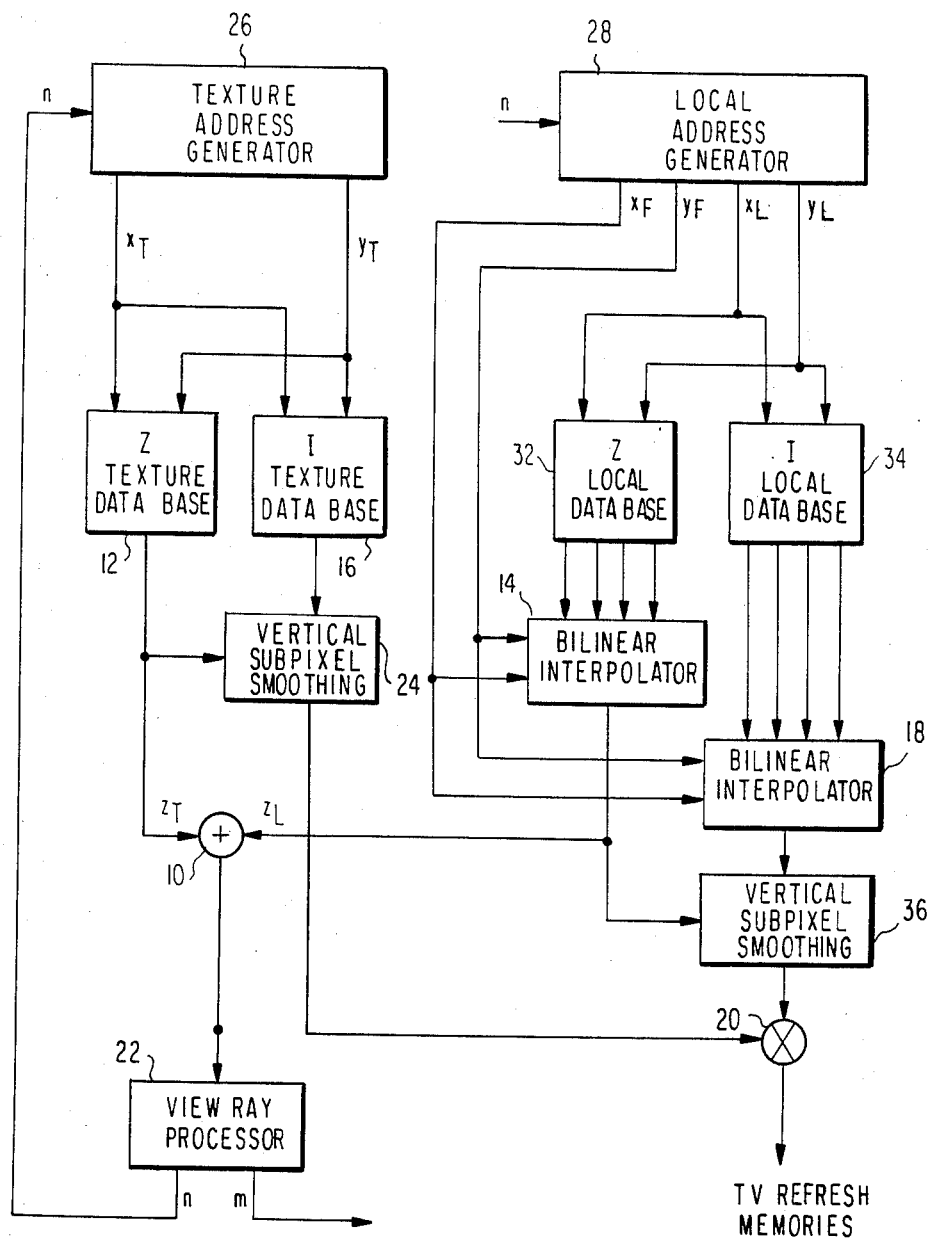
FIG. 7 is a block diagram of the three dimensional texture implementation according to the invention.

The functional block diagram of FIG. 7 illustrates the implementation of three dimensional texture. Data bases 32 and 34 are the 512×512 grid array of the converted DMA elevation, Z, and color, I, data base. Texture data base 12 is a 256×256 area of the data base 32. The eight-bit Z value is shifted by five so that elevation is defined as three whole bits plus five frictional bits. Texture data base 16 is the same area ss the texture data base 12 and is the five-bit grey scale value of data base 34.

Address generator 28 reads a square of four grid values. Bilinear interpolators 14 and 18 divide the four grid values into a 16×16 array of averaged elevation and color values. The implementation of bilinear interpolator 14 and 18 is described in application Ser. No. 527,809 by Bunker et al. Texture address generator 26 reads an elevation, Z, and color, I, from texture data bases 12 and 16. Summer 10 adds the texture elevation and the interpolated elevation. The summed elevations are applied to view ray processor 22 which determines if the view ray intercepts the elevation post. If the view ray strikes the elevation post, the post is seen and the colors are initiated via subpixel smoothing 24 and 36 to modulator 20 where the texture color modulates, or multiples, the interpolated color. The modulated color is then stored in a television refresh memory prior to display. Implementation of address generators 26 and 28 and implementation of view ray processor 22 are described in my prior application Ser. No. 546,599.

Figure 8:
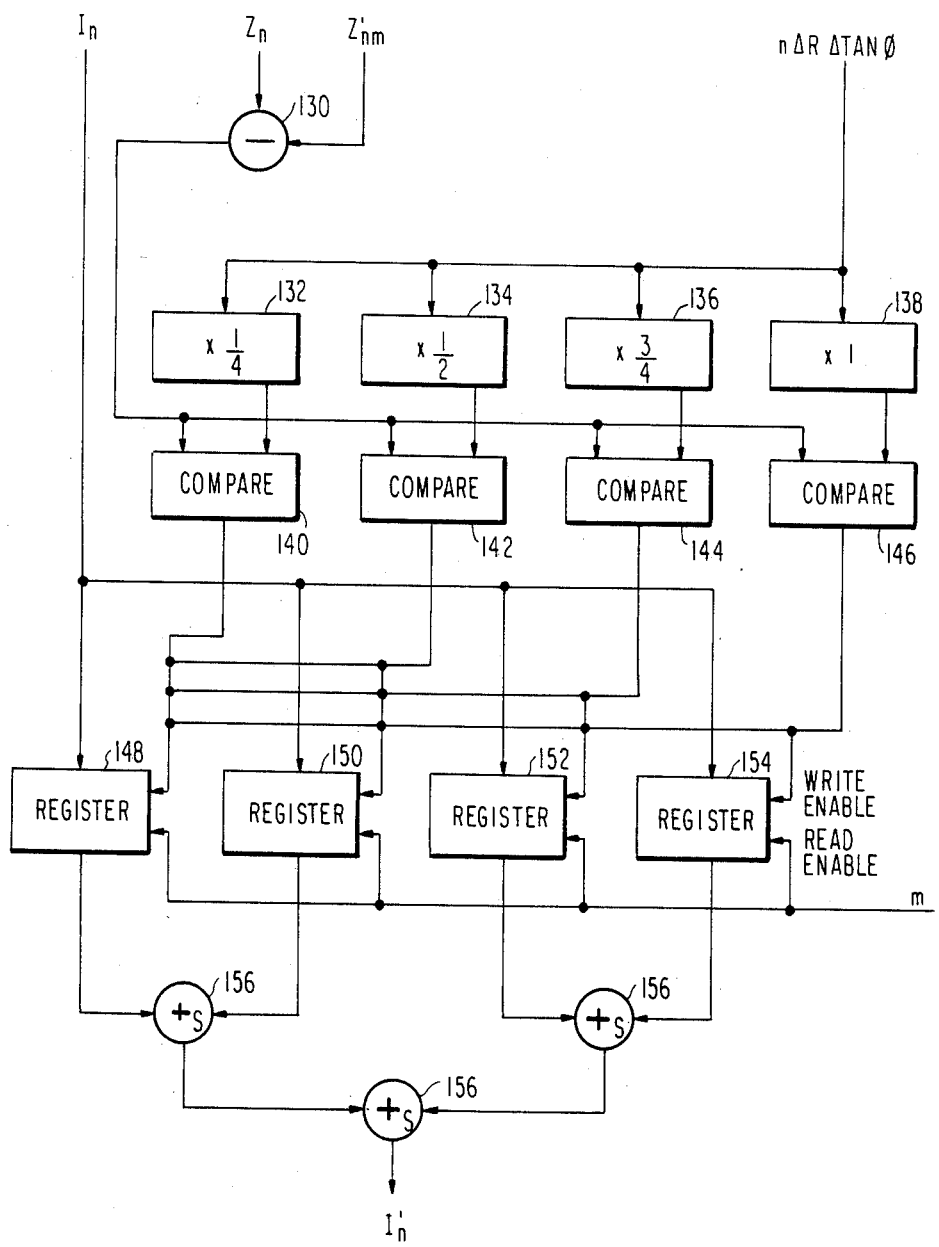
FIG. 8 is a block diagram of the subpixel smoothing circuitry.

Subpixel smoothing is required to prevent dynamic scintillation. Implementation of vertical subpixel smoothing 24 and 36 is illustrated in FIG. 8. The distance between view rays, $n\Delta R\Delta Tan\phi$, is divided into four equal increments as shown by blocks 132, 134, 136 and 138. Summer 130 determines the subpixel view ray penetration $\Delta Z$ of the elevation post $Z_n$ as follows:

$$\Delta Z = Z'_{nm} - Z_n.$$

If $\Delta Z$ is positive, $Z_n$ does not intersect the view ray and no action is taken. Comparators 140, 142, 146 and 148 compare the magnitude of $\Delta Z$ with the fractional magnitudes of $n\Delta R\Delta Tan\phi$ and generate register write enable signals for entering $I_n$ into registers 148, 150, 152 and 154 according to the logic defined in Table III below:

TABLE III

| $Z_n$ | | $I_n$ |
| Greater Than | Less Than | Register Enables |
| --- | --- | --- |
| $\frac{3}{4} n\Delta R\Delta Tan\phi$ | — | 148, 150, 152, 154 |
| $\frac{1}{2} n\Delta R\Delta Tan\phi$ | $\frac{3}{4} n\Delta R\Delta Tan\phi$ | 148, 150, 152 |
| $\frac{1}{4} n\Delta R\Delta Tan\phi$ | $\frac{1}{2} n\Delta R\Delta Tan\phi$ | 148, 150 |
| — | $\frac{1}{4} n\Delta R\Delta Tan\phi$ | 148 |

Registers 148, 150, 152 and 154 are implemented so that after one write they are latched. Any number of range increments, and the associated $Z_n$ and $I_n$, can occur between view rays but once the registers are all loaded, they have no effect. The registers are read out on the next view ray increment on the m enable signal. The output is then averaged by summers 156 and written into television refresh memory as indicated in FIG. 7.

Theoretically, subpixel smoothing implements an area times color rule. Thus, both horizontal and vertical subpixel smoothing are required. However, with limited pitch and roll, excellent results have been achieved with only vertical subpixel smoothing. Real time image generation such as required by television, i.e. 30 frames per second, can be achieved by parallel implementation of the three dimensional texture processing. Scene objects, such as buildings, trees and tanks, can be implemented by the processing described in application Ser. No. 527,809 by Bunker or by the method of Bolton in U.S. Pat. No. 4,343,037. As both of these inventions use a scanning approach, their techniques can be easily merged into terrain scenes generated by the processing according to this invention.

The three dimensional texture map is used to enhance the foreground of perspective scenes. In one reduction to practice of the invention, a software simulation of the view ray processor had a variable sample rate across the data base. The first 512 sample points or addresses along a sweep from the viewpoint had a range increment (as measured along the horizonal boresight) of one sixteenth of a grid unit or about 18½ feet on the ground. The next 256 addresses were one quarter of a grid unit increments and so on until a maximum increment of two grid units (approximately 592 feet) was reached. This step size was maintained until the edge of the data base was crossed where processing stopped for that particular sweep.

It was found by experiment that if three dimensional texture is applied to the first 512 sample points along a sweep and is then faded out as a linear function of range along the next 512 sample points, that the level of texture detail in the foreground blends very well into that of the background and that the boundary of the three dimensional texture is not visible, even in dynamic sequences.

Direct interpolation over boundaries, such as the edge of a lake, produce the undesirable effect of merging the feature so the boundary becomes fuzzy. To avoid this, the edges of planimetric features are interpolated and the full colors on each side of the interpolated edge are painted. The interpolated edge is broken by the texture elevation pattern.

I claim:

1. In combination in a system for the real-time computer generation and display of visual scenes:
    (a) display means;
    (b) first memory means for storing a grid data base of elevation posts at predetermined intervals for the visual scene to be generated;
    (c) second memory means for storing a grid data base of display data for corresponding ones of said elevation posts;
    (d) view ray generator means for defining a horizontal field of view as a predetermined number of sweeps perpendicular to a boresight at a view point, incrementing the change in range R from the view point and defining for each sweep the changes $\Delta X$ and $\Delta Y$ in said elevation post data base, accumulating ΔX and ΔY to generate an X,Y data base address for reading from said first memory means the elevation data for that address, stepping a view ray down for each range increment ΔR by an increment of $\Delta R \text{Tan} \phi_m$ where $\phi_m$ is the view angle for the $m^{th}$ view ray, stepping the distance between sweeps by the increment $\Delta R \Delta \text{Tan} \phi$ for each range increment, ΔR, comparing at each range increment the accumulated elevation value of the view ray with an elevation value input for said X,Y data base address, and if a view ray strikes an elevation post, reading display data for that post from said second memory means to said display means, otherwise reading the elevation data for the next elevation post from said elevation post data base and repeating said comparison;

(e) first and second interpolator means through which said elevation data and display data are respectively read to provide interpolated values of elevation and display data with interpolation levels varying inversely with range;

(f) third and fourth memory means respectively storing elevation data and display data values for a texture data base corresponding to a substantial part or all of said grid data base; and (g) means for reading from said texture data base delta values of elevation data and display data, adding the delta value and interpolated value of elevation data and applying the sum as the elevation value input for said X,Y data base address in said view ray generator, and multiplying the delta value and interpolated value of display data and applying the product as the display data input to said display means, thereby to add three-dimensional texture to the visual scene as represented on said display means.

2. The system of claim 1 wherein the delta values of elevation data of said texture data base read from said third memory means correspond to fractional values of the elevation values for the elevation posts of said grid data base read from said first memory means.

3. The system of claim 1 wherein the delta values of display data of said texture data base read from said fourth memory means correspond to grey scale values of the color values of display data of said grid data base read from said second memory means.

4. The method of real-time computer generation and display of visual scenes in which three-dimensional texture is added to the display to provide enhanced visual cues to the observer for close approach scenes, comprising the steps of:

(a) storing elevation and planimetric data values for a grid data base with grid points distributed at predetermined intervals over the visual scene to be generated;

(b) reading elevation and planimetric data values from said data store for each location of the data base grid, and interpolating the values thus read to an interpolation level dependent upon the closeness of that location to the observer view point;

(c) storing a texture data base comprising a subset of said grid data base;

(d) obtaining from such texture data base store delta values of elevation and planimetric data;

(e) adding the uninterpolated delta value of elevation data obtained from said texture data base to the interpolated value of elevation data from said grid data base for each close-approach display location, and processing the summed elevation data value so derived to selected and read from said grid data base an interpolated value of planimetric data for that display location;

(f) multiplying the interpolated value of planimetric data thus derived from the grid data base times the corresponding uninterpolated delta value of planimetric data obtained from said texture data base; and (g) utilizing the product of such multiplication as the display output for the visual scene to be generated, thereby to add three-dimensional texture to the scene as portrayed.

5. The method of claim 4 wherein the delta values of elevation data obtained from said texture data base correspond to fractional values of the elevation data from said grid data base.

6. The method of claim 4 where said planimetric data values as stored in said grid data base represent color data, and wherein the delta values of planimetric data obtained for said texture data base are grey scale values of such color data.

7. The method of claim 4 wherein the interpolation of elevation data values read from said grid data base is to an interpolation level varying directly with the closeness of the scene portrayed, and the texture data base values are derived by sampling at intervals inversely related to such interpolation level.

8. The method of claim 4 further comprising the steps of:

smoothing said interpolated values of planimetric data with the interpolated values of elevation data from said grid data base to derive smoothed display data, and smoothing said uninterpolated delta values of planimetric data with the uninterpolated delta values of elevation data from said texture data base to derive smoothed texture data, said multiplication being of said smoothed texture data times said smoothed display data.

* * * * *